United States Patent
Billotte

[19]

[11] Patent Number: 6,149,360
[45] Date of Patent: Nov. 21, 2000

[54] VEHICLE WITH TRUSSED BOX BEAM LOAD SUPPORTS

[76] Inventor: Keith W. Billotte, 2213 Willow La., Clearfield, Pa. 16830

[21] Appl. No.: 09/414,373

[22] Filed: Oct. 7, 1999

[51] Int. Cl.[7] .................. B60P 7/12; B61D 3/16
[52] U.S. Cl. .................. 410/37; 410/32; 410/36; 410/42; 52/650.1
[58] Field of Search .................. 410/32, 34, 35, 410/36, 37, 42; 280/404, 143; 52/636, 634, 643, 650.1, 731.2

[56] References Cited

U.S. PATENT DOCUMENTS

| | | |
|---|---|---|
| 1,090,171 | 3/1914 | Schisler . |
| 1,454,037 | 5/1923 | Byrne . |
| 1,554,909 | 9/1925 | Eldridge . |
| 1,656,871 | 1/1928 | Schnitzer . |
| 1,707,008 | 3/1929 | Havemeyer . |
| 2,057,863 | 10/1936 | Voorhees . |
| 2,088,781 | 8/1937 | Folsom . |
| 2,936,051 | 5/1960 | Martin . |
| 3,482,531 | 12/1969 | Tack . |
| 3,944,257 | 3/1976 | Dockins .................. 280/404 |
| 3,972,540 | 8/1976 | Donaldson .................. 280/404 |
| 3,999,354 | 12/1976 | Anter et al. .................. 524/732 |
| 4,084,835 | 4/1978 | Spencer et al. .................. 280/148 |
| 4,268,051 | 5/1981 | Skirvin et al. . |
| 4,623,161 | 11/1986 | Sprague .................. 280/414 |
| 4,989,768 | 2/1991 | McNulty .................. 224/42.45 |
| 5,071,164 | 12/1991 | Gregg .................. 280/786 |
| 5,433,055 | 7/1995 | Schliep .................. 52/694 |
| 5,567,096 | 10/1996 | Howard .................. 410/42 |
| 5,580,121 | 12/1996 | Dange et al. .................. 296/186 |
| 5,588,273 | 12/1996 | Csagoly . |
| 5,964,557 | 10/1999 | Eng . |
| 5,993,126 | 11/1999 | Janzen . |

*Primary Examiner*—D. Glenn Dayoan
*Assistant Examiner*—Scott A. Carpenter
*Attorney, Agent, or Firm*—Duane, Morris & Heckscher LLP

[57] ABSTRACT

A vehicle is structured for transporting heavy loads of unstable elongated items such as logs or heavy pipes and includes longitudinally spaced lateral members or "bunks" and vertical stakes at the ends of the bunks. Each of the bunks comprising an elongated steel beam having at least three spaced mutually perpendicular plates defining a hollow inside of the beam, preferably a box beam formed by welding together elongated plates. A number of trusses are placed in the hollow inside of the beam, at least some of which extend diagonally between spaced plates, especially the upper and lower plates. The trusses form triangular bracing structures with the plates for supporting the load on the beams at spaced points along the length of the vehicle. In a preferred arrangement, a center truss forms a medial triangular structure and at least two wing trusses form lateral triangular structures on each side of the center truss, and the beams are supported by longitudinal frame members of the vehicle in the area of the center truss. The center truss and wing trusses form triangles that abut proceeding from the center to the ends of the beams. The trusses have plates that are attached at plug welds to one or more of the external plates forming the box beam, namely having through holes that are filled when weld the truss to the plate from the outer surface of a plate forming the beam. The vertical stakes are also made from truss reinforced hollow beams, preferably with an upward taper, and can be integral with, attached to or received in pockets in the beams. The resulting vehicle maximizes load bearing strength and minimizes weight, thereby improving the vehicle load carrying capacity.

17 Claims, 5 Drawing Sheets

VEHICLE WITH TRUSSED BOX BEAM LOAD SUPPORTS

FIELD OF THE INVENTION

The invention generally relates to vehicles for transportation of heavy and potentially unstable loads, and more particularly to load bearing structures for supporting such loads while confining them to the cargo bed of the vehicle. In particular, a cargo holding structure is disclosed having truss-reinforced hollow beams and preferably also side stakes, which is especially apt for carrying logs.

BACKGROUND OF THE INVENTION

To transport cargo on a truck, railcar or other vehicle, a cargo bed structure is needed that will bear the weight of the cargo during transport. The cargo may comprise regular shapes such as rectangular crates and the like, which are stackable, or may comprise items that do not stack in a stable manner, such as cylindrical items. Structure is needed to confine such unstable items to the cargo bed. Examples of elongated unstable load items are logs, pipes and the like. Such items typically (although not exclusively) are arranged parallel to the longitudinal axis of the vehicle, and are stacked in ranks atop one another. Insofar as the load is carried on a flat cargo bed or a bed having members disposed in a plane, some sort of lateral confinement is needed to keep such unstable items in the stack rather than permitting the items to roll and thereby spread laterally out from a compact stack.

Various techniques are known for supporting and laterally confining loads. Some cargo holding structures, such as open-top box structures, may be employed to support load items without regard to whether or not the load items are elongated, whether or not they are shaped to form stable stacks, etc., because the box shape holds the contents, having vertical walls bordering and confining the load to a flat bed. For loads that extend longitudinally, a continuous flat bed may not be required and longitudinally spaced lateral beams can support elongated load items that bridge between at least two adjacent beams. Unstable loads such as logs or pipes are supported on a continuous flat bed or on longitudinally spaced lateral beams, and the load is confined laterally. The lateral confinement can involve longitudinally extending sidewalls or a series of spaced vertical posts along the lateral edges of the flat bed, often referred to as stakes. Other possibilities are possible such as flexible chains or belts that wrap over and are cinched to confine the load. Similarly to the stakes or stake receptacles provided on many flatbed trucks, a truck or other support vehicle having longitudinally spaced lateral beam members or bunks can also have vertical structures resembling stakes, mounted at the lateral ends of the bunks.

Prior art trucks that are used in connection with the hauling of unstable or loosely stacked loads such as raw timber, conduit pipe, etc., normally have a chassis fabricated from two or more steel I-beam members spaced apart laterally, and extending from the front to the rear portion of the truck's cargo bed. A plurality of shorter, transversely extending beam members, known as bunks, are supported by the twin I-beams in longitudinally spaced relation to one another. The bunks support the load at spaced locations and distribute the weight evenly along the I-beams. The bunks are secured to the I-beams by bolts, welding or the like. Such cargo bed constructions are well known in the art and are suited for transporting elongated cargo items that span over two or more adjacent spaced bunks. See, for example, U.S. Pat. Nos. 5,580,121; 5,567,096; 5,433,055; 5,071,164; 4,9899,768; 4,623,161; 4,084,835; 3,999,354; 3,972,540; and 3,944,257.

Inasmuch as elongated items can be supported on spaced bunks as opposed to a full bed having structures extending continuously over the full length and width, the transverse bunk supporting structure can results in a saving of overall weight in the vehicle. The bunks and I-beams require sufficient structural strength and rigidity to support the elongated items. A particularly demanding example of elongated load items to be transported is a load of rough cut timber. Such a load may comprise a plurality of large and heavy solid wood logs. In loading the logs expeditiously in field conditions, it is not unusual that the logs are set down hard on the transport vehicle, or even dropped onto the cargo supporting bed. The structural strength required to survive such treatment can be achieved by use of I-beams that are thick enough to bear the load. Such I-beams comprise an elongated central web that is typically oriented in a vertical plane, integrally coupled to upper and lower parallel webs that are perpendicular to the central web and typically are oriented horizontally to provide horizontal support or support-engaging surfaces, respectively. The tendency of an I-beam arranged in this manner to bend due to a vertical load is resisted because bending force is applied in the plane of the central web. However the I-beam must nevertheless be thick and durable enough to withstand the expected loads, and therefore can be quite heavy. Solid bars or laminations of elongated solid plates can be mounted or attached to one another to form solid or semi-solid longitudinal beams and lateral bunks. Solid or semi-solid members of this type can provide the necessary rigidity and resistance to bending and warping, but they are heavy, adding considerably weight to the vehicle. The vehicle has a maximum gross weight, both in terms of design weight and maximum legal weight for over-the-road travel. Therefore, any unnecessary weight caused by particularly durable or unnecessarily heavy structural members reduces the weight capacity available for carrying cargo on the vehicle. For a log truck, added weight means that fewer logs can be carried per load, and more trips are required to move a given number of logs.

There is a need for a vehicle chassis, especially for carrying elongated cargo items such as logs, that provides the structural strength needed to support a load of heavy elongated items, preferably at longitudinally spaced points, while at the same time having the least weight that will reasonably conveniently provide sufficient load bearing strength to carry the load without deformation to the vehicle.

SUMMARY OF THE INVENTION

In a preferred embodiment, a vehicle is structured for transporting heavy loads of unstable elongated items such as logs or heavy pipes and includes longitudinally spaced lateral members or "bunks" and vertical stakes at the ends of the bunks, each hollow and reinforced internally by diagonal trusses. Each of the bunks includes an elongated steel beam having at least three spaced mutually perpendicular plates defining a hollow inside of the beam, preferably a box beam formed by welding together elongated plates. A number of trusses are placed in the hollow inside of the beam, at least some of which extend diagonally between spaced plates, especially the upper and lower plates. The trusses form triangular bracing structures with the plates for supporting the load on the beams at spaced points along the length of the vehicle. In a preferred arrangement, a center truss forms a medial triangular structure and at least two wing trusses form lateral triangular structures on each side of the center truss, and the beams are supported by longitudinal frame members of the vehicle in the area of the center truss. The center truss and wing trusses form triangles that abut proceeding from the center to the ends of the beams. The trusses have plates that are attached at plug welds to one or more of the external plates forming the box beam, namely having through holes that are filled when weld the truss to the plate from the outer surface of a plate forming the beam. The vertical stakes are also made from truss reinforced hollow beams, preferably with an upward taper, and can be integral with, attached to or received in pockets in the beams. The resulting vehicle maximizes load bearing strength and minimizes weight, thereby improving the vehicle load carrying capacity.

Adjacent plates of the elongated steel beams can be integral along at least one of the abutting edges of the adjacent plates forming the beams. For example, the beam can be formed by attached angle iron forms. As another alternative, the beam can comprise an I-beam with the trusses provided between the spaced webs of the channels formed on one or both opposite sides of the I-beam.

The center truss consists essentially of an upwardly opening V-form, and the laterally outer wing trusses form lateral upwardly opening V-forms that abut against the center truss. Proceeding into the respective stake, a truss plate in the stake can abut with the laterally outer plate of the associated wing truss, forming a downwardly opening V-form. In this manner the triangular truss forms support one another. Additional plates or webs within the hollow beam can be provided, for example at the abutments of the plates forming the trusses, and can extend perpendicular to the beam (i.e., vertical and parallel to the longitudinal axis of the vehicle.

The trusses can be attached to one, two or more of the adjacent plates by the plug welds. The material filling the plugs holes after welding can be ground flush with the outer surface of the beam.

The vertical side stakes can have truss members that abut, but preferably has truss members that are oriented diagonally but are spaced from one another along the stake. This further reduces the weight of the vehicle while providing adequate support against deformation of the side stakes (specifically outward bending). The vertical stakes are provided at the laterally opposite ends of at least some said plurality of bunks, and define the lateral constraints on the load.

Additional aspects and variations are also provided and are discussed in greater detail below.

BRIEF DESCRIPTION OF THE DRAWINGS

The foregoing and other features and advantages of the invention are more fully disclosed rendered apparent from the following detailed description of preferred embodiments, which is to be considered together with the accompanying drawings wherein like numbers refer to like parts throughout the figures, and wherein.

DETAILED DESCRIPTION OF THE PREFERRED EMBODIMENT

The following description is to be read in connection with the drawings, which are part of the overall written disclosure, and refers to the invention as shown in the figures. Therefore, as used in the description, terms such as, "horizontal", "vertical", "left", "right", "up", "down", "top," "bottom," "on," "under," etc. in their adjective or adverb forms (e.g., "horizontally", "rightwardly", "upwardly", etc.) refer to the orientation of the structure of the invention as it is illustrated and seen when that figure faces the reader. Similarly, the terms "inwardly" and "outwardly" generally refer to the orientation of a surface relative to the axis of elongation of the item of which the surface is part, or the axis of rotation, as appropriate. The terms "connected," "interconnected" and the like, when used in this disclosure describe the relationship between two or more structures, indicates that such structures are secured or attached relative to one another, and may be attached directly or indirectly through intervening structures, such attachment including movable and pivotal connections. The term "operatively connected" means that the foregoing direct or indirect connection between the structures allows such structures to operate as described or intended by virtue of such connection.

Figure 1:
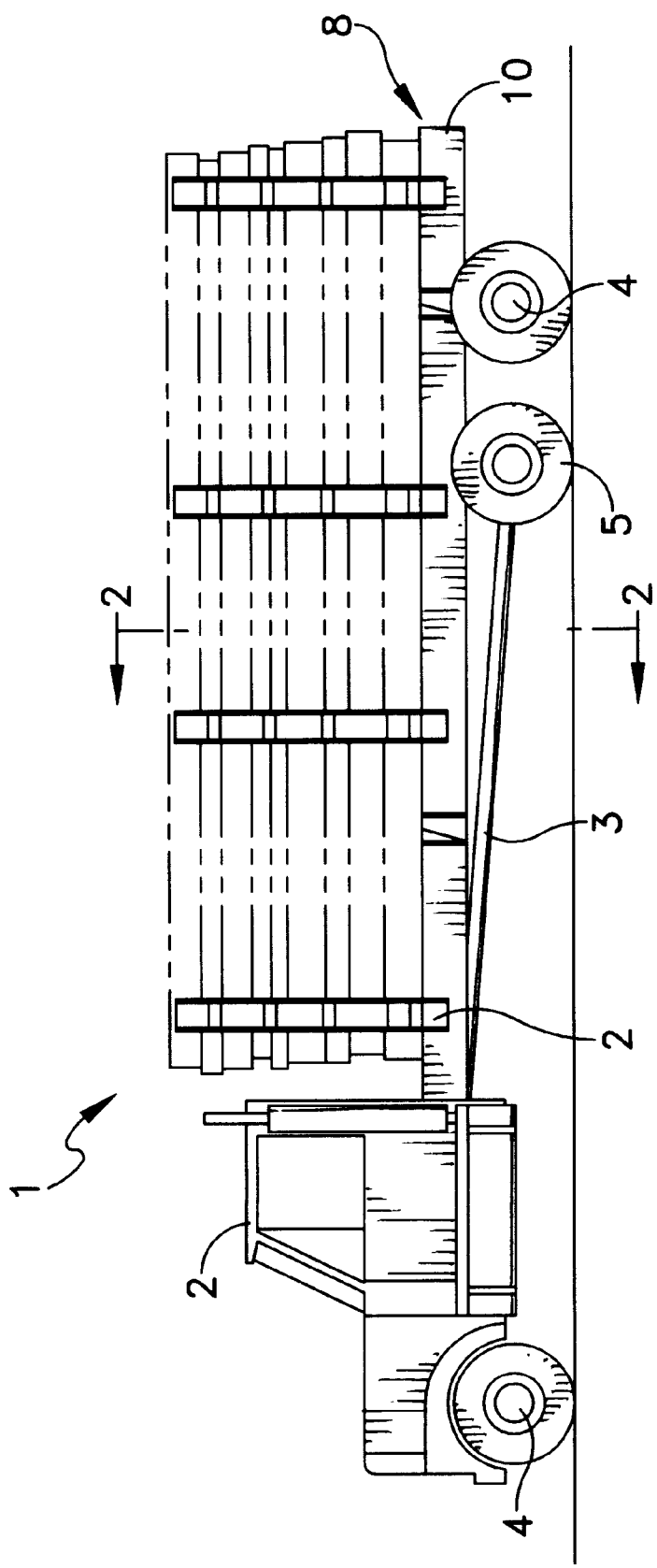
FIG. 1 is a perspective view of a truck having a trailer and cargo bed formed according to the present invention.

FIG. 1 shows an exemplary vehicle in the form of a flatbed truck 1, in accordance with the invention, in which the "flat" bed is defined by a plurality of supporting beams transverse to the longitudinal axis of the vehicle, with longitudinal spaces between the beams. The invention can be applied to other vehicles or modes of conveyance, such as flatbed trailer or semitrailer, a railroad car or other mobile support for loads comprising elongated load items that are not readily formed into a stable stack. In the self-propelled example shown, the vehicle has a cab 2, a motor and transmission generally indicated by the drive means 3, front and rear axles 4 and wheels 5. Rear axles 4 support a load bed 8 comprising two center beams 10 extending longitudinally of the vehicle, supported and rigidly spaced by transverse members extending between them. Center beams 10 may be conventional I-beams, "C"-shaped beams, or box beams formed from structural steel of the type normally used in the manufacture of heavy duty vehicles.

Figure 2:
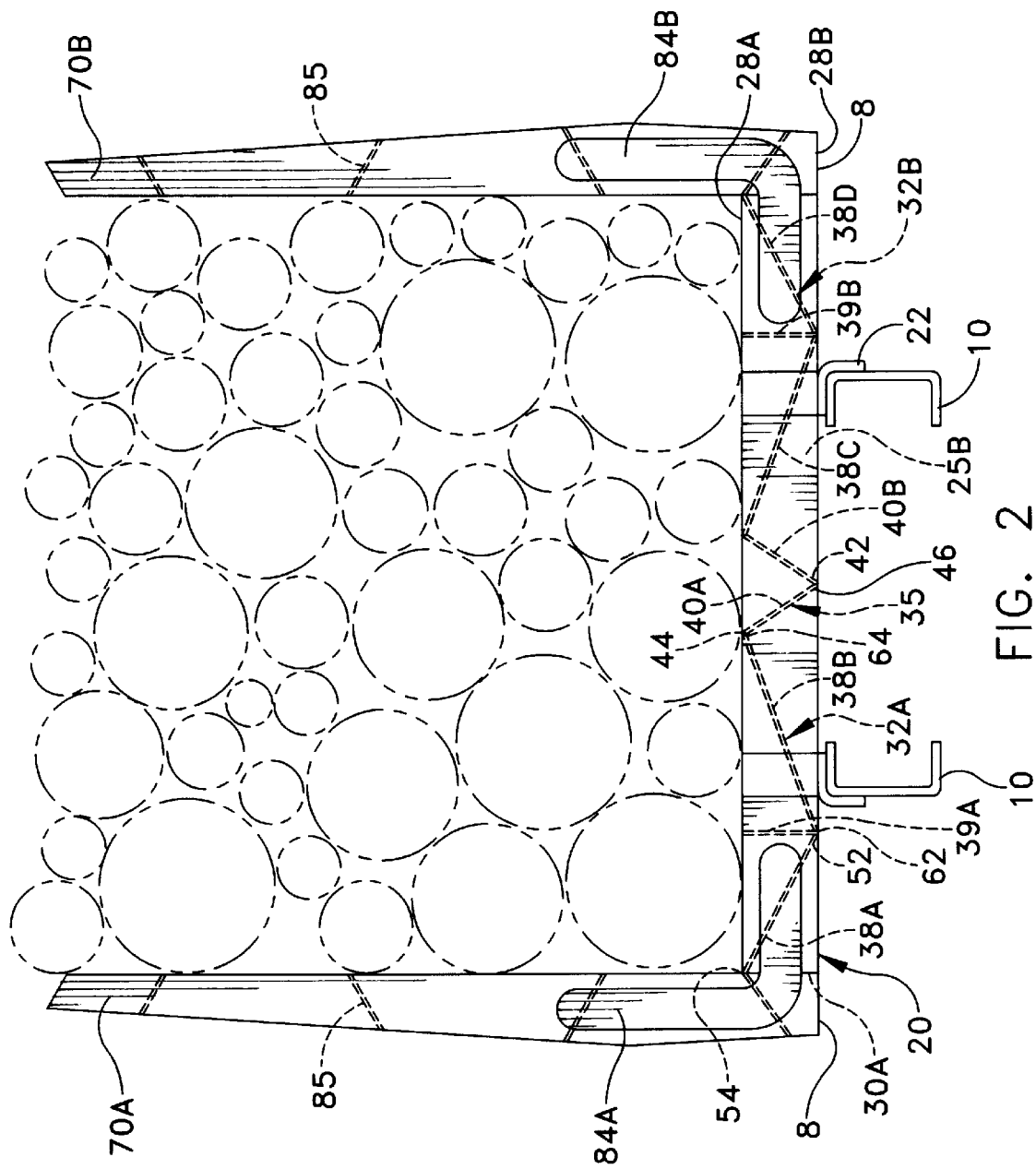
FIG. 2 is a cross-sectional view of the trailer and cargo bed shown in FIG. 1, as taken along line 2—2 in FIG. 1.
Figure 3:
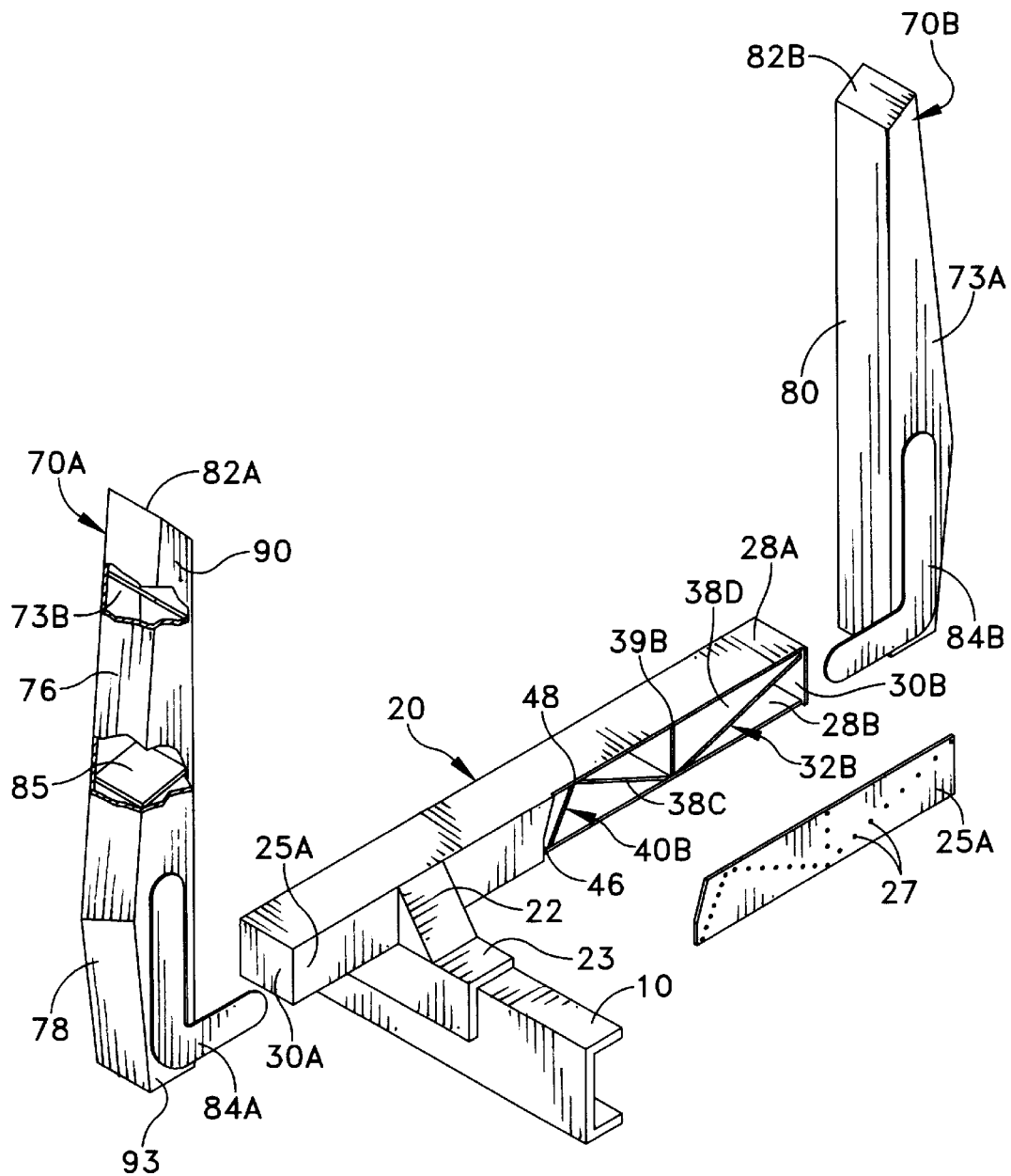
FIG. 3 is a perspective, partially exploded view of a truss bunk formed according to the present invention.
Figure 4:
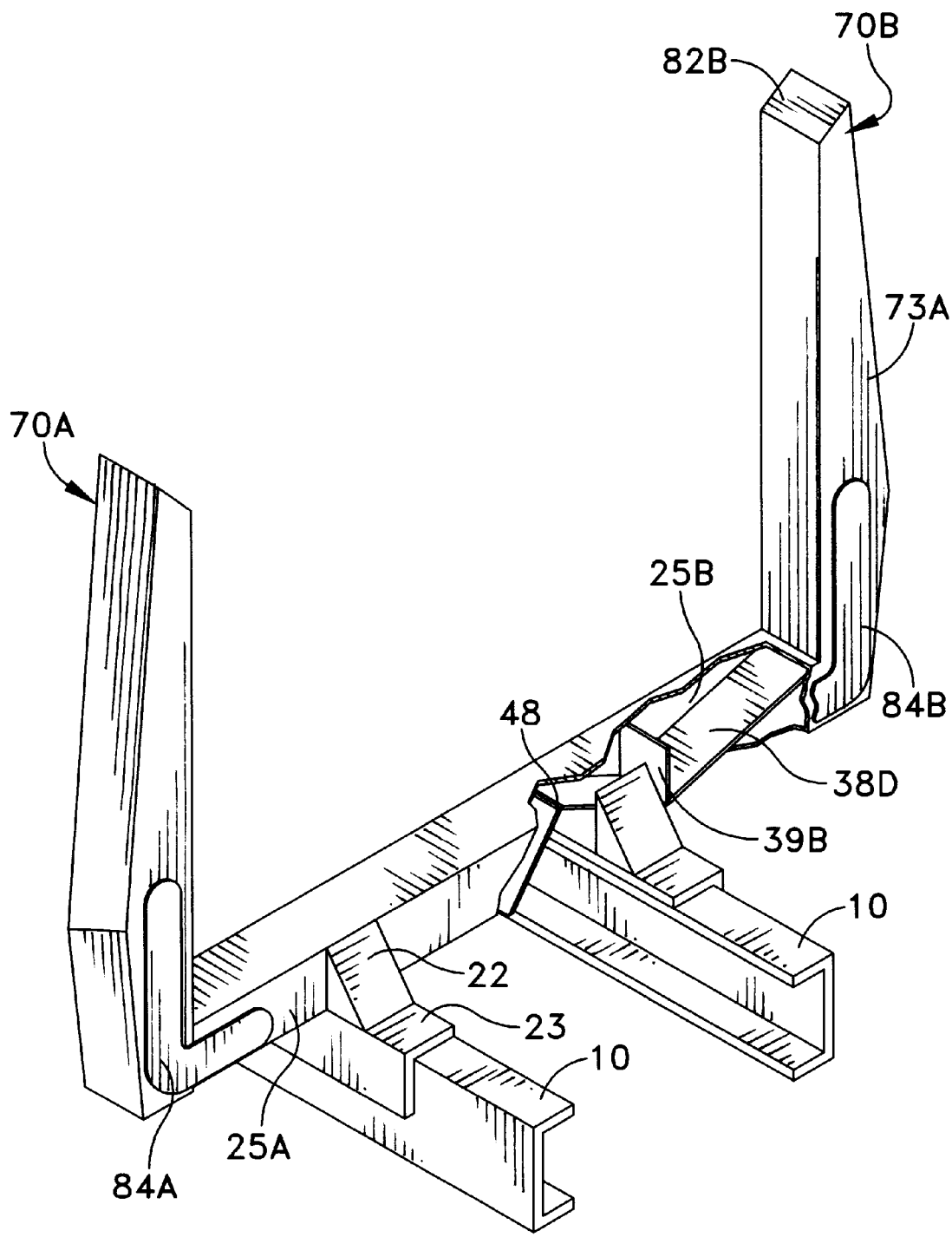
FIG. 4 is a perspective view, partially in phantom and partially broken-away, of a truss bunk and stakes formed according to one embodiment of the present invention.
Figure 5:
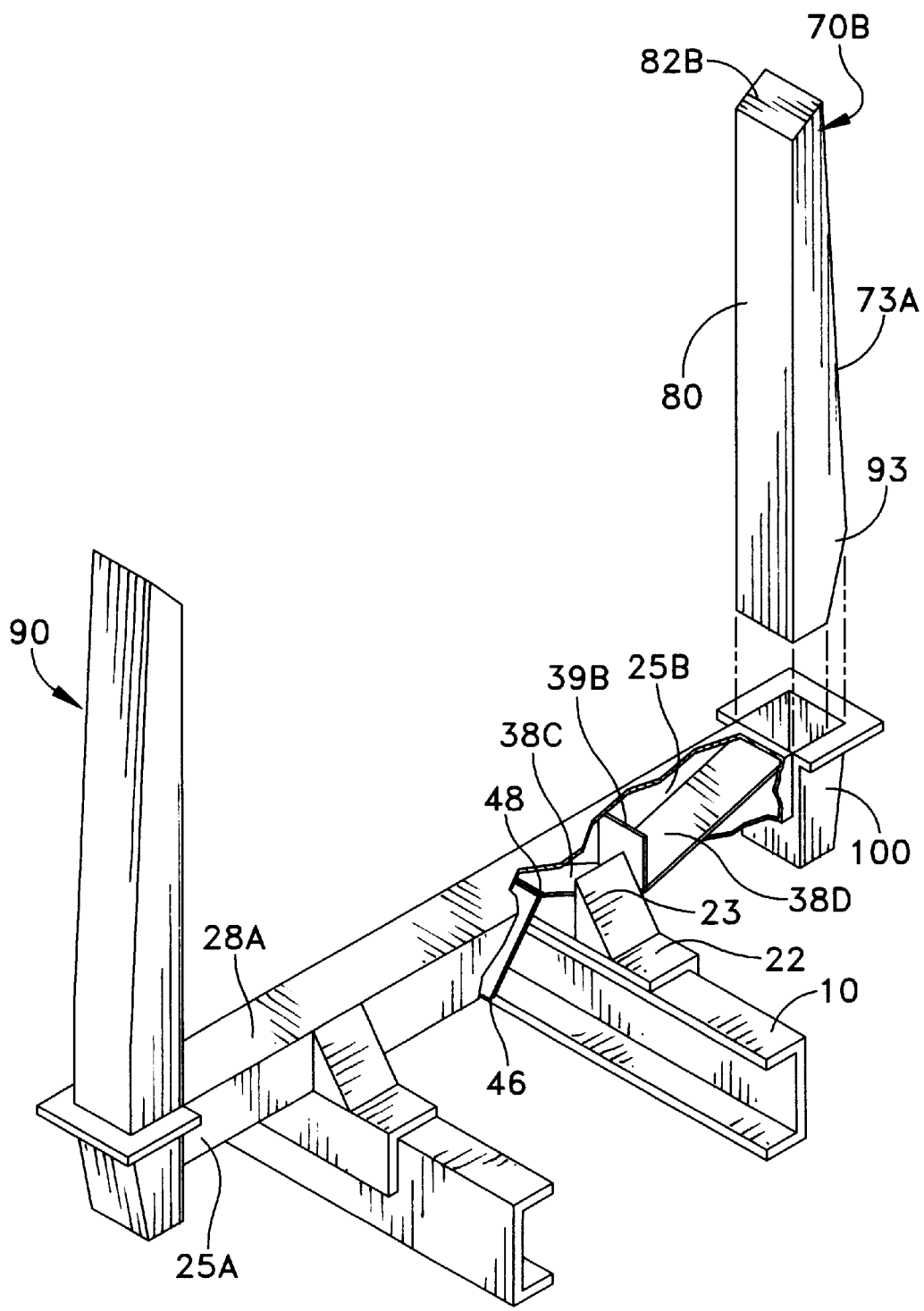
FIG. 5 is a perspective view, partially in phantom and partially broken-away, of a truss bunk and removable stakes formed according to an alternative embodiment of the present invention.

As shown in FIGS. 1, 2 and 3, the transverse members include a plurality of transverse truss bunks 20 are joined to the top surfaces of center beams 10 by brackets 22 which may include a side support gusset 23 for stability. These beams 10 can provide the sole structures attaching the longitudinal beams 10 or additional transverse structures can be included for structurally supporting beams 10 apart from the transverse beams that are provided to support the load. The load items in the embodiment shown are logs, typically generally cylindrical cut tree trunks that also have irregularities such as diversions from a cylinder, variations in thickness and the like, which make the load items difficult to stack in a neat array.

Each truss bunk 20 comprises an elongate, generally rectangular hollow steel beam having two side plates 25A, 25B, top and bottom plates 28A, 28B, and end caps 30A, 30B. Inside the hollow beam are two wing trusses 32A, 32B, and a center truss 35. The component plates, caps and truss members of each truss bunk 20 are preferably made using as flat rectangular plates of steel, e.g., T1 alloy steel, preferably A 514 grade B for a log truck, the outer plates are welded together along their abutting seams to form a hollow beam with a square or rectangular cross section; the internal truss members are welded at their ends to the inside surface of the external beam plates, at least the top and bottom plates, and preferably also one or both of the side plates of the hollow beam. This presents a challenge in a closed form of box beam because the external plates would normally prevent access to the internal truss plates for welding.

Side plates 25A, 25B include a plurality of through-holes 27 to allow for plug welding of side plates 25A, 25B to the internal structures of each truss bunk 20, as will hereinafter be disclosed in further detail. Top plate 28A may be the same thickness as the other plates, e.g., about 0.125 inches (3 mm), or it may have a greater thickness, e.g., 0.250–0.375 inches, so as to protect the relatively more vulnerable top surface from denting. A thicker top surface is advantageous, for example, if the load items are logs, which are sometimes inadvertently or even deliberately dropped onto the vehicle.

A truss bunk 20 is preferably constructed by first joining a side plate 25B, top and bottom plates 28A, 28B and end caps 30A 30B together, via welding or the like, to form an open faced box (FIG. 3). Two or more of the associated plates can be integral, for example in an embodiment in which the bunk comprises angle iron members (namely with L-shaped cross sections) that are joined by welding at diagonally opposite corners. Similarly, a channel member can be closed at its open end by welds along the abutting edges of the channel member and the covering plate. The members joined to form the bunks need not be limited to webs that form a rectangular box beam, and the box beam need not be closed on all four sides. For example, an I-beam bunk can have trusses affixed in one or both of the channels formed at opposite sides of the I-beam, and such channels can be closed by a welded covering plate or left open.

In the embodiment shown, wing trusses 32A, 32B and center truss 35 are themselves formed from four wing truss plates 38A, 38B, 38C, 38D and two center truss plates 40A, 40B, arranged within the open faced box. The truss plates can be made of the same steel plate stock used to form the outer walls of the hollow box beam. More particularly, center truss plate 40A is welded, or otherwise securely fastened along a bottom edge 42 at about the center of bottom plate 28B, and along a top edge 44 to top plate 28A. Center truss plate 40A extends outwardly at an angle of about 50 to about 60 degrees relative to bottom plate 28B so as to extend between and support top and bottom plates 28A, 28B, The truss plate 40A is preferably oriented in this inclined manner and welded at its ends to plates 28A, 28B, respectively. Center truss plate 40B is welded, or otherwise securely fastened along a bottom edge 46 at about the center of bottom plate 28B and adjacent to bottom edge 42 of center truss plate 40A. Center truss plate 40B is welded, or otherwise securely fastened along a top edge 48 to top plate 28A. Second center truss plate 28B extends outwardly at an angle of about 50 to about 60 degrees relative to bottom plate 28B so as to extend between top and bottom plates 28A, 28B. In this construction, center truss plates 40A, 40B together form a "V"-shaped truss at the center of truss bunk 20. The upwardly and downwardly opening V-shapes of the trusses are closed by the outer plate at the top or bottom of the beam respectively, thereby forming a structurally stable and triangular form that renders the box beam substantially rigid.

Wing trusses 32A, 32B are formed on each side of center truss 35 by wing truss plates 38A, 38B, 38C, 38D. More particularly, wing truss plate 38A is welded, or otherwise securely fastened along a bottom edge 52 at a position that is about equidistant between center truss 35 and end cap 30A. Wing truss plate 38A extends outwardly at an angle of about 20 to about 25 degrees relative to bottom plate 28B so as to extend between top and bottom plates 28A, 28B, and is welded or otherwise securely fastened along a top edge 54 to the interior corner formed at the intersection of top plate 28A and end cap 30A.

Wing truss plate 38B is welded, or otherwise securely fastened along a bottom edge 62 at a position that is about equidistant from center truss 35 and end cap 30A, and adjacent to bottom edge 52 of wing truss plate 38A. Wing truss plate 38B extends inwardly at an angle of about 20 to about 25 degrees relative to bottom plate 28B so as to extend between top and bottom plates 28A, 28B, and is welded, or otherwise securely fastened along a top edge 64 to top plate 28A adjacent to top edge 44 of center truss 35. It will be understood that wing truss 32B is formed in accordance to the forgoing description, utilizing wing truss plates 38C, 38D.

In this way, wing truss plates 38A, 38B and 38C, 38D likewise form "V"-shaped trusses at each side of center truss 35. Moreover, the respective V-shaped trusses abut one another endwise across the length of the beam member. A center strut 39A, 39B may be welded at one end adjacent to edges 62 and 52 and at the other end to the inner surface of top plate 28A so as to provide further structural stiffness to truss bunk 20.

To complete the construction of truss bunk 20, namely to close off the hollow interior containing the trusses, side plate 25A is welded or otherwise securely fastened along its peripheral edges to the edges of top and bottom plates 28A, 28B and end caps 30A, 30B.

Side plate 25A is also welded or otherwise securely fastened to wing trusses 32A, 32B and center truss 35, via plug welds. Through holes 27 are provided for access, the holes being aligned along the edges of the truss plates within the hollow beam. Such holes can be provided on one of the side plates (in which case the truss is preferably welded along a line to the inside surface of the opposite side plate), or along both opposite side plates. The internal trusses are welded to the side plates at the through holes 27, which preferably are filled in by the welding process. The plug welds are then ground flush with the outer surface of the side beams so as to provide a relatively smooth surface texture. It will be appreciated that a similar plug weld technique can be used at up to all four of the plates defining the outer surfaces of the box beam. However, preferably continuous linear welds are employed to attach the trusses to the inner surfaces of the hollow beam before the beam is closed by welding on the final plate. The plug holes serve to affix the final plate to the trusses that are otherwise affixed to the other plates of the hollow beams.

Preferably, two stakes 70A, 70B are fastened to each truss bunk 20 so as to project upwardly from each end, adjacent to end caps 30A, 30B, limiting the lateral displacement of the load. Each stake 70A, 70B comprises an elongated substantially hollow steel beam having two side plates 73A, 73B, an upper top plate 76, a lower top plate 78, bottom plate 80, two end caps 82A, 82B, two "L"-shaped gusset plates 84A, 84B, and a plurality of truss plates 85. The component parts of each stake 70A, 70B can be formed from flat plates of steel as described above with reference to the hollow beam bunks, or can comprised channels, angle iron, etc. The preferred material for the stakes is T1 alloy steel plate, A 514 grade B, welded together to form a hollow beam.

Whereas the load items exert less laterally outward force proceeding upwardly from the bunks, side plates 73A, 73B forming the stakes can be upwardly tapered and thus comprise a non-uniform pentagonal shape. When assembled, stakes 73A, 73B include an elongate tapered upper section 90. The bottom and relatively shorter section 93 can be downwardly tapered for engaging with an opening in the bunk for receiving the stake. Alternatively, the bottom section 93 can have parallel sides instead of a taper. Bottom plate 80 is positioned along an inner straight edge of side plates 73A, 73B, with upper top plate 76 positioned along an edge of elongate tapered upper section 90 and lower top plate 78 positioned along an edge of shorter tapered lower section 93. All of the plates that make up each stake 73A, 73B are welded, or otherwise securely fastened to one another according to the foregoing arrangement. Truss plates 85 are arranged within stakes 73A, 73B so as to provide structural strength and rigidity. "L"-shaped gusset plates 84A, 84B may be welded to each side of stakes 73A, 73B, adjacent to lower top plate 78 so as to provide for the fastening of stake 73A, 73B to each truss bunk 20, via welding or the like fastening means.

Alternatively, a receptacle or pocket 100 may be formed in each end of each truss bunk 20, adjacent to end caps 30A, 30B, to receive the lower portion of each stake 73. In an embodiment in which the lower ends of the stakes are squared rather than downwardly tapered, the pocket 100 can be squared as well; however there is a tendency of the stakes and/or pockets to become worn such that the stakes become free to wobble somewhat. Therefore, preferably the stakes are downwardly tapered and the openings defined by pockets 100 flare upwardly at an angle complementary to the downwardly narrowing taper of the stakes. Thus the stakes drop into the pockets until they abut and the stakes are held tightly.

The invention having been disclosed, additional variations will now be apparent to those skilled in the art. The invention is by no means limited to the particular constructions herein disclosed and shown in the drawings as examples, but also comprises any modifications or equivalents within the scope of the appended claims.

What is claimed is:

1. A vehicle adapted for transporting loads, comprising:
    at least one longitudinally extending beam member provided on a mobile carriage such that a load can be supported on the beam member for transport with the carriage;
    a plurality of laterally extending transverse beams attached to said beam member and forming bunks for supporting the load on the beam member, the bunks being affixed to the beam member at longitudinally spaced positions along the beam member for supporting said load at the spaced positions, the bunks comprising spaced substantially parallel upper and lower plate members, and further comprising a plurality of trusses disposed between the upper and lower plate members, at least some of said trusses being attached diagonally between the upper and lower plate members and forming with the upper and lower plate members a plurality of triangular structures, whereby the bunks are reinforced by the triangular structures for carrying said load.

2. The vehicle of claim 1, wherein the beam member comprises at least one elongated connecting web between the upper and lower plate members, and wherein the trusses abut against the upper and lower plate members and against said connecting web.

3. The vehicle of claim 2, wherein the trusses are rigidly connected to each of the upper and lower plate members and the connecting web, said upper an lower plate members and the connecting web forming at least a hollow C-shaped channel enclosure around the trusses.

4. The vehicle of claim 1, wherein the beam member comprises at least two elongated space connecting webs between the upper and lower plate members, the connecting webs and the upper and lower plate members forming a hollow box beam, and wherein the trusses abut against the upper and lower plate members and against the connecting webs inside the hollow box beam.

5. The vehicle of claim 4, wherein the trusses are welded to the top and bottom plates and to at least one of the connecting webs.

6. The vehicle of claim 5, wherein the trusses are welded to at least one of the connecting webs via plug welds that extend through said one of the connecting webs.

7. The vehicle of claim 5, wherein the top and bottom plates and at least one of the connecting webs are integral, and at least a second one of the connecting webs is attached to the top and bottom plates by welding along an abutting edge of each of the second one of the connecting webs and the top and bottom plates, respectively.

8. The vehicle of claim 5, wherein the top and bottom plates and at both of said connecting webs are separate pieces attached to one another along abutting edges of each of the connecting webs and the top and bottom plates.

9. The vehicle of claim 1, further comprising at least one vertical stake member rigidly mounted adjacent to each laterally opposite end of at least one of said bunks, the stake member confining the load laterally inwardly of a respective end of said bunk, and wherein the stake member comprises at least two spaced substantially parallel plates coupled by a connecting plate and at least one diagonal truss connected between the parallel plates.

10. The vehicle of claim 9, further comprising a receptacle pocket formed adjacent to said opposite ends of the bunks, and wherein said vertical stake member in complementary with and supported in the pocket.

11. A vehicle adapted for transporting loads comprising, in combination;
    at least two laterally spaced longitudinally extending beams carried on a mobile support;
    a plurality of bunks perpendicular to and spaced longitudinally along the beams, the bunks being mounted on an upper side of said beams, each of the bunks comprising an elongated steel beam having at least two mutually perpendicular plates partly defining a hollow inside of the beam, a plurality of trusses being positioned in the hollow, at least one of the trusses extending diagonally between said at least two plates, the trusses forming a triangular structure with said the at least two said plates for supporting the load on the beams.

12. The vehicle of claim 11, wherein at least two adjacent plates of the elongated steel beam are welded along an abutting edge of said adjacent plates.

13. The vehicle of claim 12, wherein at least two adjacent plates of the elongated steel beam are integral along an abutting edge of said adjacent plates.

14. The vehicle of claim 11, wherein the trusses form at least one center truss forming a medial triangular structure and at least two wing trusses forming lateral triangular structures on each side of said center truss.

15. The vehicle of claim 12, wherein the trusses are attached to at least one of said two adjacent plates by a plurality of plug welds substantially aligned to the trusses, each of the plug welds comprising a filled opening in said at least one of the plates at which a weld spans between said one of the plates and a respective said truss disposed against said one of the plates on an inside of the elongated steel beam.

16. The vehicle of claim 15, further comprising a plurality of vertical stakes attached adjacent to laterally opposite ends of at least some said plurality of bunks, the stake members defining lateral constraints for the load, each of the stake members comprising four spaced plates welded together along abutting edges to form a hollow tube, and further comprising at least one diagonal truss in said hollow tube.

17. The vehicle of claim 11, further comprising a receptacle pocket formed adjacent to said opposite ends of the bunks, and wherein said vertical stake member in complementary with and supported in the pocket.

* * * * *